Patented Aug. 27, 1940

2,212,995

UNITED STATES PATENT OFFICE 2,212,995

PREPARATION OF CATALYSTS AND THEIR USE IN THE POLYMERIZATION OF HYDROCARBONS

Albert Wassermann, London, England

No Drawing. Application January 16, 1940, Serial No. 314,149. In Great Britain January 25, 1939

25 Claims. (Cl. 196—10)

This invention relates to the catalytic preparation of liquid polymers of olefines, especially those boiling in the range of commercial fuel.

The object of the invention is to provide improved catalytic processes for the formation of liquid polymers of olefines particularly for the polymerization of olefines or mixtures of olefines, especially for the catalytic polymerization of isobutene or n-butene or of mixtures of these compounds.

The invention consists in a process for the treatment of olefines for the formation of liquid polymers which comprises subjecting an olefine within the temperature range of 20° to 300° C. to the action of a catalyst consisting of an originally powdery mixture of cupric sulphide, cupric sulphate and a phosphoric acid, which powder has been converted into a solid of a convenient shape by subjecting it at a temperature below 40° C. to a pressure higher than 100 but lower than 1,000 atmospheres.

The invention also consists in a process for the treatment of olefine containing hydrocarbon mixtures, especially for the treatment of hydrocarbon mixtures containing isobutene or n-butenes, for the formation of liquid polymers from the olefines contained in the said hydrocarbon mixtures, which comprises subjecting the hydrocarbons to the action of a catalyst. This catalyst consists of an originally powdery mixture of cupric sulphide, cupric sulphate and ortho-phosphoric acid or pyro-phosphoric acid or both ortho- and pyro-phosphoric acids, which powder has been compressed into a solid of a convenient shape by subjecting it at relatively low temperature, preferentially at room temperature, to a pressure until it can maintain its shape on removal from the mould, but preferentially not to a high degree of pressure unnecessary for that purpose. The cupric sulphide contained in the catalyst can be synthetically prepared, but it is also possible to use naturally occurring cupric sulphides, such as copper pyrites. Another possibility consists in using mixtures of synthetically prepared cupric sulphide and naturally occurring cupric sulphides.

PREPARATION OF CATALYSTS

Naturally occurring cupric sulphide or cupric sulphide prepared according to the methods mentioned in my copending application No. 208,695, filed May 18, 1938, or a mixture of natural and synthetic cupric sulphide is associated with cupric sulphate by using the methods mentioned in my copending application No. 208,695.

The cupric sulphide cupric sulphate mixture is then mechanically mixed with ortho-phosphoric acid and/or pyro-phosphoric acid. The acids can be used in pure form or dissolved in water, the amount and the concentration of the acids depending in general on the reactivity of the olefine. The amount of the phosphoric acids or of the solution of the phosphoric acids should not exceed, however, about 50% of the weight of the catalyst so that the mixture containing the phosphoric acids is a powder not a paste. The powdery mixture is then pressed into granules, cubes, bars or other forms of convenient shape at a pressure above 100 atmospheres but below 1,000 atmospheres and at a temperature below 40° C., preferentially at room temperature.

EXAMPLES OF APPLICATION OF THE CATALYSTS

In all the following examples, the parts are parts by weight, and the temperatures are in degrees centigrade.

*Example A.*—This deals with the polymerization of amylene. The starting substance is trimethylethylene and the catalyst is a mixture of one part finely powdered natural copper sulphide containing some copper sulphate with 0.05 part of water and 0.05 part of pyro-phosphoric acid. The mixture is, at room temperature, submitted to a pressure of 250 atmospheres. 10 parts of the starting substance and 1 part of the catalyst were enclosed in a container the volume of which was about 20 times larger than the volume of the starting substance, and the container was heated at 100° C. during 60 hours. Then the container was cooled, opened, and the liquid was first shaken with water and then dried and fractionally distilled. In this way 5 parts unchanged starting substance were obtained, and 4 parts of a liquid boiling between 130° and 155° C. The refractive index of this liquid was 1.5520 at 17° C., for the yellow sodium line, the density at 25° C. was 0.763, the content of carbon was 85.3%, and that of hydrogen 14.6%.

Liquids of similar properties are obtained if instead of pyro-phosphoric acid ortho-phosphoric acid be used and if instead of natural copper sulphide natural copper pyrite or a synthetic copper sulphide with or without carrier substances be used.

*Example B.*—This deals with the polymerization of a fraction obtained from natural petroleum gas by fractional distillation. The starting substance was a mixture consisting of 5% to 10% isobutene, 70% to 80% butene-1 and cis- and trans-butene-2 and 10% butane. The catalyst was a mixture of 30 parts of synthetic copper sulphide, 4 parts copper sulphate with 2 parts of syrupy ortho-phosphoric acid. This mixture is submitted, at room temperature, to a pressure of 120 atmospheres, whereby the specific gravity of the catalyst becomes about 2.0. The catalyst was introduced in vessels, the volume of which was 1.2 to 10 times larger than that of the catalysts, and the gaseous starting material was passed over the catalysts at atmospheric pressure. The reaction vessel containing the catalyst was heated to 200° C., and the starting substance was passed over the catalyst with a speed of 30 litres per hour per litre of catalyst. The product was distilled in a trap which was kept at room temperature, and purified as described in Example A. The yield of the product was 0.3 part per hour. The product is a liquid of boiling point 100 to 200° C., at atmospheric pressure, containing 85.5% carbon and 14.1% hydrogen. Liquids of similar properties were obtained when the starting substance was a mixture of butenes which were obtained by dehydration of normal butyl alcohol.

*Example C.*—This deals with the polymerization of a gas mixture which was obtained from the cracking gases of petroleum by fractional distillation. The starting substance was a mixture consisting of 29% isobutene, 19% butadiene, 16% butene-1, 25% cis- and trans-butene-2, 4% isobutane and 7% normal butane. The catalyst was a mixture of 15 parts synthetic copper sulphide, 9 parts copper sulphate and 4 parts of pyro-phosphoric acid. This mixture is submitted at 30° C. to a pressure of 500 atmospheres, whereby the specific gravity of the catalyst becomes about 2.3. The catalyst was introduced in vessels, the volume of which was 1.2 to 10 times larger than that of the catalyst, and the gaseous starting material was passed over the catalysts at atmospheric pressure, at room temperature and at a rate of 40 to 80 litres per hour per litre catalyst. In a single passage 30–60% of the starting substance was expended.

The product obtained is a liquid of pleasant smell of boiling point 100°–200° C. at atmospheric pressure, and approximately similar chemical composition to that of the liquid obtained in Example B. The yield of the product is 0.5–1 part per hour. Similar yields were obtained when the temperature of the polymerization was 100° or 150° C., but at 200°, 250° and 300° C. the yields were smaller.

In some tests at room temperature the speed with which the starting substance passed over the catalyst was 200 to 250 litres per hour per litre of catalyst. Under these conditions the yields are smaller than those given above, but the ratio of liquid obtained per starting substance expended is increased.

Processes were carried out under the same conditions as those described above, but in which the catalyst was a mixture of syrupy ortho-phosphoric acid with either natural copper pyrites or with nickel sulphides or with manganese sulphide or with lead sulphide. The results obtained were substantially similar to those mentioned above. Further it was found that a substantially similar product to that described above is obtained if the starting substance is a mixture of n-butylenes with propylene and the catalyst is a mixture of cupric sulphide, cupric sulphate with pyro-phosphoric acid, the other conditions being the same as mentioned above.

*Example D.*—Cupric sulphide prepared in acid solution is mixed with cupric sulphate and syrupy ortho-phosphoric acid in amounts such that the mixture contains not more than 40% of acid and is thereby a powder and not a paste. This powder is then pressed at 25° C. and at 100 atmospheres into tablets, which have good mechanical properties.

400 parts of the tablets of 0.5 cm. diameter and 0.2 cm. thickness containing 250 parts cupric sulphide, 100 parts cupric sulphate and 50 parts of syrupy ortho-phosphoric acid were filled into a steel reaction tube and contacted with a $C_4$-cut of a cracked gas of the same composition as that mentioned in Example C.

*Table I*

| No. | Temp., °C. | Pressure (atm.) | Time of exp. (hours) | Reactants parts | Products parts |
|---|---|---|---|---|---|
| 1 | 23 | 1 | 6 | 12 | 8 |
| 2 | 22 | 1 | 4 | 8 | 5 |
| 3 | 20 | 1 | 4 | 8 | 6 |
| 4 | 25 | 1 | 4 | 10 | 8 |
| 5 | 25 | 4–5 | 20 | 150 | 130 |

Nos. 1–4 were carried out by passing the gaseous reactants over the catalyst. No. 5 was carried out under conditions in which the liquid reactants were in contact with the catalyst. In all the runs the products are colourless liquids containing 85–86% carbon, 14–15% hydrogen, the boiling point was 90–200° C. at atmospheric pressure, the specific gravity was 0.70–0.80 and 1 g. of the liquid reacted with 220–250 cm.³ n/10 bromine solution. The catalysts of experiments Nos. 1–4 were used for 2 weeks and no measurable decrease in the catalytic activity could be observed during this time. Similar results were obtained if the tablets were prepared by pressing mixtures of cupric sulphide, cupric sulphate and phyro-phosphoric acid or mixtures of cupric sulphide and natural copper pyrite and phosphoric acids.

GENERAL

It is known that sulphuric acid, mixtures of phosphoric acids with certain metal phosphates and mixtures of phosphoric acids with silicious materials or other inert carriers are catalysts for the polymerization of olefines. The data in Table II enable a comparison to be made between the methods involving these catalysts and the method dealing with phosphoric acids in admixture with metal sulphides and metal sulphates.

*Table II*

| No. | Catalyst | Properties | Phosphate content | Temp. at which solid catalyst is prepared | |
|---|---|---|---|---|---|
| 1 | Sulphuric acid | Corrosive liquid | | | |
| 2 | Mixtures of phosphoric acids with metal phosphates. | Noncorrosive solid | High | Above 100°C. | Regeneration of phosphoric acid and carrier substance difficult or impossible. |
| 3 | Mixtures of phosphoric acids with silicious materials. | do | do | do | Do. |
| 4 | Mixtures of phosphoric acids with heavy metal sulphides and sulphates. | do | Small | Room temp. | Regeneration of heavy metal and phosphoric acid easy. |

Catalyst No. 1 is a corrosive liquid which can only be used under controlled conditions in relatively expensive apparatus. Catalysts Nos. 2–4 can be prepared in the form of non-corrosive solids and a continuous operation in a simple apparatus is possible. Catalyst No. 2 is prepared by combining cadmium or copper phosphate with a phosphoric acid and by drying and heating the mixture at a temperature above 100° C. whereby a solid cake is produced which is broken into fragments. Catalyst No. 3 is prepared by mixing an acid of phosphorus with a silicious material or with another earthly carrier substance until a paste is obtained, this being calcined at temperatures above 100° C. and sized into granules. Both catalysts Nos. 2 and 3 are characterized by a relatively high content of phosphoric acids or phosphate. Catalyst No. 4 on the other hand, is converted into a solid not by calcining it at elevated temperature, but by compression at room temperature. In the preparation it is not necessary to start from a paste as in the case of catalyst No. 3, and therefore catalyst No. 4 may contain a relatively small amount of phosphoric acids.

In the preparation of the catalysts Nos. 2 and 3 the phosphoric acids act as binders, whereas in the preparation of catalyst No. 4 the heavy metal sulphide and the heavy metal sulphate are the binders. It is of interest in this connection to point out that a mixture of cupric sulphide with cupric sulphate can be pressed into tablets or other forms of convenient shape even without the addition of phosphoric acid but that in this case the catalytic properties, especially at low temperature are not as efficient as in the presence of phosphoric acids.

The carrier substances which are employed for the preparation of catalyst No. 3 have either a relatively small or no catalytic activity. In those cases in which the carrier substance without phosphoric acid has a measurable activity, the rate of decay is large so that in any event the catalytic activity of the carrier substance of catalyst No. 3 is of short duration. The carrier substance of catalyst No. 4 is a mixture of cupric sulphide and cupric sulphate; the catalytic activity of this mixture is larger than that of the most active carrier substance of catalyst No. 3 and furthermore the rate of decay of the catalytic activity of an appropriately prepared cupric sulphide cupric sulphate mixture is relatively small (compare my copending application No. 208,695) so that the catalytic activity of the carrier substance of catalyst No. 4 has a relatively long duration.

The efficient surface of catalyst No. 4 will depend on the pressure which had been applied to convert the originally powdery mixture into a solid. If this pressure was very high the efficient surface and therefore also the catalytic activity will become relatively small. Thus it is not suitable to apply a pressure which is substantially higher than about 1,000 atmospheres. On the other hand, it is necessary that the mechanical properties of the catalyst should be satisfactory, that is to say, the catalyst should not break into small fragments during the reaction and therefore the pressure which has been applied to convert the powder into a solid should not be smaller than about 100 atmospheres. The pressures given in the above examples vary between 100 and 500 atmospheres but by using other pressures, for instance 600, 700, 800 and 900 atmospheres satisfactory catalysts can also be produced.

The working life of all the phosphoric acid catalysts Nos. 2, 3 and 4 is long, especially if the granules or tablets are filled into vertical towers and if the reactants are passed downwardly over the catalyst. The downflow prevents, to a certain extent, the contamination of the catalyst by the gradual deposition of high boiling polymers, but nevertheless after some weeks a regeneration of the catalyst becomes necessary. The regeneration steps comprise: removal of distillable materials by the use of steam, use of oxidizing gas mixtures to burn out the carbonaceous materials, rehydration of the phosphoric acids by steam. After several such regenerations, however, the catalysts become less effective and must be replaced by fresh granules or tablets. Thus the question arises in which way the old catalyst can be employed. The deactivated granules are useless, but if a dissolution were possible a regeneration of at least a part of the constituents could be carried out. The catalysts Nos. 2 and 3 of Table II were calcined at elevated temperatures and therefore a dissolution involves considerable difficulties. Catalyst No. 4, on the other hand, is prepared at room temperature and it is relatively easy to dissolve both the phosphoric acids and the copper sulphate. These materials can either be used for the preparation of fresh catalyst granules or for the production of fertilizer or metallic copper.

The catalysts here described can be used not only for reactions of the type discussed above but also for other polymerization reactions, especially for those described in my copending Application No. 208,695. The catalysts are especially suitable for the dimerization of isobutene, the product being iso-octene, which by hydrogenation can be converted into iso-octane containing a large proportion of 2-2-4 trimethylpentane and a small proportion of 2-2-3 trimethylpentane.

The butenes referred to above may be prepared from normal butyl-alcohol according to known methods. The conversion of butyl-alcohol into butylenes and the subsequent conversion of the butylenes or of butylene mixtures into liquids boiling in the range of commercial fuel may conveniently be carried out in one apparatus.

In Examples B and C about 25 to 30 parts of the sulphide or sulphide-sulphate mixture contained about 2 to 4 parts of phosphoric acid. In other cases, however, it might be of advantage to employ other proportions, for example, 10, 20, 30 or 40 parts of the acids.

The phosphoric acids can either be pure or diluted with water. In Example A, 50% acids were used, but in some cases it is advantageous to employ other acid concentrations, for instance, 60%, 70%, 80% or 90% acid.

Processes have been carried out in which at a given temperature and pressure one and the same hydrocarbon mixture was treated with polymerizing agents comprising a mixture of cupric sulphide with cupric sulphate with equivalent amounts of various acids of phosphorus. As a result it has been found that the catalytic efficiency decreases in the order: pyro-phosphoric acid, ortho-phosphoric acid, meta-phosphoric acid. In some cases it is useful to employ catalysts involving a mixture of ortho- and pyro-phosphoric acid All the polymerizations can also be carried out by using mixtures of metal sulphides with phosphoric acids, or mixtures of metal sulphides with mixtures of metal sulphates with phosphoric acids. Instead of copper sulphides some other sulphides can also be used. In Example C reference has been made to nickel, manganese and lead sulphide but other heavy metal sulphides, especially black and brown sulphides can also be useful. An especially useful mixture is cupric sulphide and iron sulphide such as occurring in natural copper pyrites.

The reactions involving the catalysts described above may be effected either in the gas phase or in the pure liquid state, or in solution either at high or low temperatures, either at high or low pressures. In some cases it is of importance to maintain the pressure so high and the temperature so low that throughout the reaction the reactants are maintained in the liquid state, so that the catalyst is in contact with the liquid phase, not with the gas phase.

If the reactants contain isobutene, n-butenes and propylene it is sometimes useful to carry out a successive and selective polymerization, first of isobutene, which is the most reactive of the above olefines, then of the n-butenes and finally of propylene, which is least reactive. The successive and selective polymerization can be carried out in a three stage process and it is sometimes useful to maintain the reactants in one of the stages in the liquid phase; in the other stages of the process the reactants might however conveniently be in the gaseous phase. Selective polymerization in the different stages of the process can be brought about by varying the temperature. The most reactive isobutene polymerizes at relatively low temperatures, whereas higher temperatures are required to polymerize the n-butenes and still higher temperatures are required to polymerize propylene. Selective polymerization can also be brought about by using catalysts which contain a different amount of phosphoric acids. The most reactive isobutene polymerizes if it is brought into contact with catalysts containing only a relatively small amount of phosphoric acids, whereas larger amounts of phosphoric acids are required to polymerize the n-butenes and still larger amounts are required to polymerize the propylene. Still another possibility for selective polymerization consists in the use of catalysts containing different phosphoric acids. The polymerization of isobutene can be carried out by using catalyst containing ortho-phosphoric acid, whereas the remaining n-butenes and the propylene can be polymerized by using catalysts which contain pyro-phosphoric acid. Further the selctive polymerization of isobutylene takes place if the catalysts described in my co-pending application No. 208,695 are used in one of the stages of the process whereas the remaining n-butenes and the propylene can be polymerized by using the catalysts described in this specification.

I claim:

1. A process for the treatment of olefines for the formation of liquid polymers which comprises subjecting an olefine within the temperature range 20° to 300° C. to the action of a catalyst consisting of an originally powdery mixture of cupric sulphide, cupric sulphate and a phosphoric acid, which powder has been converted into a solid of a convenient shape by subjecting it at a temperature below 40° C. to a pressure higher than 100 but lower than 1,000 atmospheres.

2. A process for the treatment of olefine containing hydrocarbon mixtures for the formation of liquid polymers from the olefines contained therein which comprises subjecting said mixture at temperatures between 20° and 300° C. to the action of a catalyst consisting of an originally powdery mixture of cupric sulphide, cupric sulphate and ortho-phosphoric acid which powder has been converted into a solid of a convenient shape by subjecting it at a temperature below 40° C. to a pressure higher than 100 but lower than 1,000 atmospheres.

3. A process for the treatment of olefine containing hydrocarbon mixtures for the formation of liquid polymers from the olefines contained therein which comprises subjecting said mixture at temperatures between 20° and 300° C. to the action of a catalyst consisting of an originally powdery mixture of cupric sulphide and cupric sulphate with less than 20% ortho-phosphoric acid, which powder has been converted into a solid of a convenient shape by subjecting it at a temperature below 40° C. to a pressure higher than 100 but lower than 1,000 atmospheres.

4. A process for the treatment of olefine containing hydrocarbon mixtures for the formation of liquid polymers from the olefines contained therein which comprises subjecting said mixture at temperatures between 20° and 300° C. to the action of a catalyst consisting of an originally powdery mixture of cupric sulphide, cupric sulphate and pyro-phosphoric acid which powder has been converted into a solid of a convenient shape by subjecting it at a temperature below 40° C. to a pressure higher than 100 but lower than 1,000 atmospheres.

5. A process for the treatment of olefine containing hydrocarbon mixtures for the formation of liquid polymers from the olefines contained therein which comprises subjecting said mixture at temperatures between 20° and 300° C. to the action of a catalyst consisting of an originally powdery mixture of cupric sulphide, and cupric sulphate with less than 20% pyro-phosphoric acid, which powder has been converted into a solid of a convenient shape by subjecting it at a temperature below 40° C. to a pressure higher than 100 but lower than 1,000 atmospheres.

6. A process for the treatment of olefine containing hydrocarbon mixtures for the formation of liquid polymers from the olefines contained therein which comprises subjecting said mixture at temperatures between 20° and 300° C. to the action of a catalyst consisting of an originally powdery mixture of cupric sulphide, cupric sulphate, ortho-phosphoric acid and pyro-phosphoric acid which powder has been converted into a solid of a convenient shape by subjecting it at a temperature below 40° C. to a pressure higher than 100 but lower than 1,000 atmospheres.

7. A process for the treatment of olefine containing hydrocarbon mixtures for the formation of liquid polymers from the olefines contained therein which comprises subjecting said mixture at temperatures between 20° and 300° C. to the action of a catalyst consisting of an originally powdery mixture of cupric sulphide, and cupric sulphate with less than 20% ortho-phosphoric acid and pyro-phosphoric acid, which powder has been converted into a solid of a convenient shape by subjecting it at a temperature below 40° C. to a pressure higher than 100 but lower than 1,000 atmospheres.

8. A process for the treatment of a hydrocarbon mixture containing isobutene and n-butenes for the formation of liquid polymers from the isobutene and n-butenes contained therein, which comprises subjecting said mixture to the action of a catalyst consisting of an originally powdery mixture of cupric sulphide, cupric sulphate and ortho-phosphoric acid which powder has been converted into a solid of a convenient shape by subjecting it at a temperature below 40° C. to a pressure higher than 100 but lower than 1,000 atmospheres.

9. A process for the treatment of a hydrocarbon mixture containing isobutene and n-butenes for the formation of liquid polymers from the isobutene and n-butenes contained therein, which comprises subjecting said mixture to the action of a catalyst consisting of an originally powdery mixture of cupric sulphide and cupric sulphate with less than 20% ortho-phosphoric acid, which powder has been converted into a solid of a convenient shape by subjecting it at a temperature below 40° C. to a pressure higher than 100 but lower than 1,000 atmospheres.

10. A process for the treatment of a hydrocarbon mixture containing isobutene and n-butenes for the formation of liquid polymers from the isobutene and n-butenes contained therein, which comprises subjecting said mixture to the action of a catalyst consisting of an originally powdery mixture of cupric sulphide, cupric sulphate and pyro-phosphoric acid, which powder has been converted into a solid of a convenient shape by subjecting it at a temperature below 40° C. to a pressure higher than 100 but lower than 1,000 atmospheres.

11. A process for the treatment of a hydrocarbon mixture containing isobutene and n-butenes for the formation of liquid polymers from the isobutene and n-butenes contained therein, which comprises subjecting said mixture to the action of a catalyst consisting of an orginally powdery mixture of cupric sulphide and cupric sulphate with less than 20% pyro-phosphoric acid, which powder has been converted into a solid of a convenient shape by subjecting it at a temperature below 40° C. to a pressure higher than 100 but lower than 1,000 atmospheres.

12. A process for the treatment of a hydrocarbon mixture containing isobutene and n-butenes for the formation of liquid polymers from the isobutene and n-butenes contained therein, which comprises subjecting said mixture to the action of a catalyst consisting of an originally powdery mixture of cupric sulphide, cupric sulphate, ortho-phosphoric acid and pyro-phosphoric acid, which powder has been converted into a solid of a convenient shape by subjecting it at a temperature below 40° C. to a pressure higher than 100 but lower than 1,000 atmospheres.

13. A process for the treatment of a hydrocarbon mixture containing isobutene and n-butenes for the formation of liquid polymers from the isobutene and n-butenes contained therein, which comprises subjecting said mixture to the action of a catalyst consisting of an originally powdery mixture of cupric sulphide and cupric sulphate with less than 20% ortho-phosphoric acid and pyro-phosphoric acid, which powder has been converted into a solid of a convenient shape by subjecting it at a temperature below 40° C. to a pressure higher than 100 but lower than 1,000 atmospheres.

14. A process for the treatment of a hydrocarbon mixture containing isobutene for the formation of liquid polymers from the isobutene contained therein, which comprises subjecting said mixture to the action of a catalyst consisting of an originally powdery mixture of cupric sulphide, cupric sulphate and ortho-phosphoric acid, which powder has been converted into a solid of a convenient shape by subjecting it at a temperature below 40° C. to a pressure higher than 100 but lower than 1,000 atmospheres.

15. A process for the treatment of a hydrocarbon mixture containing isobutene for the formation of liquid polymers from the isobutene contained therein, which comprises subjecting said mixture to the action of a catalyst consisting of an originally powdery mixture of cupric sulphide and cupric sulphate with less than 20% ortho-phosphoric acid, which powder has been converted into a solid of a convenient shape by subjecting it at a temperature below 40° C. to a pressure higher than 100 but lower than 1,000 atmospheres.

16. A process for the treatment of a hydrocarbon mixture containing isobutene for the formation of liquid polymers from the isobutene contained therein, which comprises subjecting said mixture to the action of a catalyst consisting of an originally powdery mixture of cupric sulphide, cupric sulphate and pyro-phosphoric acid, which powder has been converted into a solid of a convenient shape by subjecting it at a temperature below 40° C. to a pressure higher than 100 but lower than 1,000 atmospheres.

17. A process for the treatment of a hydrocarbon mixture containing isobutene for the formation of liquid polymers from the isobutene contained therein, which comprises subjecting said mixture to the action of a catalyst consisting of an originally powdery mixture of cupric sulphide and cupric sulphate with less than 20% pyro-phosphoric acid, which powder has been converted into a solid of a convenient shape by subjecting it at a temperature below 40° C. to a pressure higher than 100 but lower than 1,000 atmospheres.

18. A process for the treatment of a hydrocarbon mixture containing isobutene for the formation of liquid polymers from the isobutene contained therein, which comprises subjecting said mixture to the action of a catalyst consisting of an originally powdery mixture of cupric sulphide, cupric sulphate, ortho-phosphoric acid and pyro-phosphoric acid, which powder has been converted into a solid of a convenient shape by subjecting it at a temperature below 40° C. to a pressure higher than 100 but lower than 1,000 atmospheres.

19. A process for the treatment of a hydrocarbon mixture containing isobutene for the formation of liquid polymers from the isobutene contained therein, which comprises subjecting said mixture to the action of a catalyst consisting of an originally powdery mixture of cupric sulphide and cupric sulphate with less than 20% ortho-phosphoric acid and pyro-phosphoric, which powder has been converted into a solid of a convenient shape by subjecting it at a temperature below 40° C. to a pressure higher than 100 but lower than 1,000 atmospheres.

20. A process for the treatment of a hydrocarbon mixture containing n-butenes for the formation of liquid polymers from the n-butenes contained therein, which comprises subjecting said mixture to the action of a catalyst consisting of an originally powdery mixture of cupric sulphide, cupric sulphate and ortho-phosphoric acid, which powder has been converted into a solid of a convenient shape by subjecting it at a temperature below 40° C. to a pressure higher than 100 but lower than 1,000 atmospheres.

21. A process for the treatment of a hydrocarbon mixture containing n-butenes for the formation of liquid polymers from the n-butenes contained therein, which comprises subjecting said mixture to the action of a catalyst consisting of an originally powdery mixture of cupric sulphide and cupric sulphate with less than 20% ortho-phosphoric acid, which powder has been converted into a solid of a convenient shape by subjecting it at a temperature below 40° C. to a pressure higher than 100 but lower than 1,000 atmospheres.

22. A process for the treatment of a hydrocarbon mixture containing n-butenes for the formation of liquid polymers from the n-butenes contained therein, which comprises subjecting said mixture to the action of a catalyst consisting of an originally powdery mixture of cupric sulphide, cupric sulphate, and pyro-phosphoric acid, which powder has been converted into a solid of a convenient shape by subjecting it at a temperature below 40° C. to a pressure higher than 100 but lower than 1,000 atmospheres.

23. A process for the treatment of a hydrocarbon mixture containing n-butenes for the formation of liquid polymers from the n-butenes contained therein, which comprises subjecting said mixture to the action of a catalyst consisting of an originally powdery mixture of cupric sulphide and cupric sulphate with less than 20% pyro-phosphoric acid, which powder has been converted into a solid of a convenient shape by subjecting it at a temperature below 40° C. to a pressure higher than 100 but lower than 1,000 atmospheres.

24. A process for the treatment of a hydrocarbon mixture containing n-butenes for the formation of liquid polymers from the n-butenes contained therein, which comprises subjecting said mixture to the action of a catalyst consisting of an originally powdery mixture of cupric sulphide, cupric sulphate, ortho-phosphoric acid and pyro-phosphoric acid, which powder has been converted into a solid of a convenient shape by subjecting it at a temperature below 40° C. to a pressure higher than 100 but lower than 1,000 atmospheres.

25. A process for the treatment of a hydrocarbon mixture containing n-butenes for the formation of liquid polymers from the n-butenes contained therein, which comprises subjecting said mixture to the action of a catalyst consisting of an originally powdery mixture of cupric sulphide and cupric sulphate with less than 20% pyro-phosphoric acid and ortho-phosphoric acid, which powder has been converted into a solid of a convenient shape by subjecting it at a temperature below 40° C. to a pressure higher than 100 but lower than 1,000 atmospheres.

ALBERT WASSERMANN.